United States Patent Office 3,331,787
Patented July 18, 1967

3,331,787
METHOD OF PREPARING AN OXIDATION CATALYST
Carl D. Keith, Summit, Paula M. Kenah, East Orange, and Daniel L. Bair, Roselle Park, N.J., assignors to Engelhard Industries, Inc.
No Drawing. Filed Feb. 15, 1966, Ser. No. 527,494
15 Claims. (Cl. 252—439)

This application is a continuation-in-part of application Ser. No. 256,820, filed Feb. 7, 1963 and now abandoned.

This invention relates to the manufacture of catalysts and more particularly to catalysts composed of a refractory support provided with a thin film or coating of a catalytically active refractory metal oxide containing a catalytically active metal. In a more specific embodiment the present invention is directed to the preparation of catalysts having a catalytic structure that makes them particularly suited for use as oxidation catalysts in the purification of automobile exhaust gases and industrial waste gases.

The metals and metal oxides of Group VIII of the Periodic Table have long been acknowledged as oxidation catalysts. They have, for example, been employed per se in pellet or granular form, but more commonly have been deposited as the catalytically active portion on an inert support or carrier. While many of these oxidation catalysts perform successfully under relatively mild conditions, there has been current demand for an oxidation catalyst which is active enough chemically and rugged enough physically to withstand extremely severe operating conditions over a long period of time. For example, the use of oxidation catalysts for the purification of exhaust gases from automobiles has been suggested in the past but has not been widely adopted due to the fact that the catalysts available have been of insufficient activity, exhibited short life and/or were incapable of sustaining the physical stresses and strains involved. This invention concerns the preparation of a catalyst of high activity, long life and extreme durability.

In accordance with the method of the present invention, an aqueous dispersion containing a chemically, i.e., catalytically active refractory metal oxide and a water-soluble platinum group metal compound is first formed. The refractory metal oxide may be combined with the platinum group metal compound, while the former is in either its hydrous or dehydrated (activated or calcined) form. The aqueous dispersion is then applied to the external surfaces of a certain chemically and catalyically inert refractory support and the thus-coated support is calcined to provide the support with a film of said active refractory metal oxide containing catalytically effective amounts of the platinum group metal. The film may be continuous or discontinuous but is usually relatively uniform over the surface of the support. The slurry of refractory metal oxide and platinum group metal can be treated, either before or after deposition on the support with hydrogen sulfide to fix the active platinum group metal as a sulfide.

The refractory support or carrier of the present invention, onto which the aqueous dispersion of the present invention is applied, is a solid, unitary or monolithic, skeletal body having a plurality of unobstructed openings or channels therethrough in a direction of desired fluid flow and is preferably sized and shaped to cover at least a major portion of the cross-sectional area of the reaction zone in which it is to be used. Advantageously, the external surfaces of the unitary body are shaped to fit the reaction zone into which it is to be disposed.

The support or carrier is constructed of a substantially chemically inert, substantially catalytically inactive rigid solid material capable of maintaining its shape and strength at high temperatures, for instance up to 1100° C. or more. The material has often a bulk density of about 0.45 to 1.05 grams per cubic centimeter, preferably about 0.5 to 0.9 gram per cubic centimeter, and may be unglazed, containing a major proportion of crystalline material. Preferably the material is essentially entirely crystalline in form containing at least about 90% crystalline material and is marked by the absence of any significant amount of glassy or amorphous matrices, for instance of the type found in porcelain materials. Further, the support has considerable accessible porosity as distinguished from the substantially non-porous porcelain utilized for electrical appliances, for instance, spark plug manufacture, characterized by having relatively little accessible porosity, typically about 0.011 cc./g. The accessible pore volume not including the volume of the fluid flow channels is at least 0.03 cubic centimeter per gram of support preferably in the range from 0.04 to 0.3 cc./g.

The walls of the channels of the unitary skeletal support of the invention contain macropores in communication with the channels to provide increased accessible catalyst surface, and an absence of small pores for high temperature stability and strength. Whereas the superficial surface area of such structures may be of the order of 0.001 to 0.01 m.²/g. including the channels, the total surface area is typically hundreds of times greater, so that much of the catalytic reaction will take place in the large pores. The skeletal structure has a macropore distribution such that over 95% of the pore volume is in pores of a size i.e. diameter of over 2,000 A., and over 5% of the pore volume is in pores having a size of over 20,000 A. In a preferred embodiment over 20% of the pore volume is in pores of a size over 20,000 A.

Generally the total surface area, that is including the pores of the support or carrier of the present invention as distinguished from the apparent surface area, is at least about 0.08 square meter per gram, preferably about 0.2 to 2 square meters per gram. The geometric superficial or apparent surface area of the carrier including the walls of the openings should be as large as is consistent with an acceptable back pressure in the fluid flow system. Ordinarily, in the treatment of auto exhaust gases, the volume of catalyst and the superficial surface area are adjusted to a back pressure of less than about 10 pounds per square inch, and preferably less than about 5 pounds per square inch, at maximum acceleration. The superficial surface area will often be about 0.5 to 6, preferably 1 to 2.5, square meters per liter of support.

Thus, the openings through the body can be of any shape and size consistent with the desired superficial surface and should be large enough to permit free passage of the fluids to be reacted and to prevent plugging by particulate matter that may be present in the fluids as, for instance, lead compounds. In one embodiment, the channels or openings are generally parallel and extend through the support from one to an opposite side, such openings being usually separated from each other by preferably thin walls defining the openings. In another embodiment, a network of channels permeates the body. The channels are unobstructed or substantially unobstructed to fluid flow. For most efficient operation, the openings are distributed across essentially the entire face or cross-section of the support subject to initial contact with the fluid to be reacted. The preferred supports or carriers are zircon-mullite characterized by having good thermal shock resistance because of its low coefficient of thermal expansion and alpha alumina although other similar chemically inert refractory crystalline ceramic materials can also be employed. Examples of other refractory materials suitable as a support or carrier are, for instance, sillimanite, magnesium silicates, zircon, petalite, spodumene, cordierite, alumino-silicates, mullite, etc. Any of these usually essentially crystallite materials may be formed into refractory bodies as may be desired in a mix with a minor amount of a binder. Suitable binders include clays for instance ball clays, calcium carbonate, magnesium aluminum silicates (V-gums) and $Na_2SiO_3$ either used alone or in a balanced combination.

As mentioned, the platinum group metal compound can be added to the refractory oxide while the oxide is in its hydrous form or alternatively after substantial dehydration of the refractory oxide even to its activated or calcined form. Thus, the refractory oxide deposited on the support of the invention may be a catalytically active refractory oxide or a refractory oxide capable of being placed in a catalytically active form by calcination. In the former case, constituting one embodiment of the present invention, the aqueous dispersion applied to the support is prepared by dispersing finely-divided activated refractory metal oxide in an aqueous medium and adding thereto the platinum group metal compound. The resulting aqueous dispersion is then applied to the support as a thin coating and the coated support dried and calcined. In a second embodiment of the present invention, the aqueous dispersion is prepared by first forming an aqueous slurry of the refractory metal oxide in its hydrous form, adding the platinum group metal compound to the slurry and then drying and calcining the resulting mixture to substantially dehydrate the oxide to provide an active refractory metal oxide containing the platinum group metal. The thus-formed activated refractory metal oxide platinum group metal compound mixture is then dispersed in a finely divided form with water to produce the aqueous dispersion applied to the support of the present invention. Alternatively, the slurry applied to the support may contain the platinum group metal compound and one or more of the hydrous or hydrate forms of the refractory metal oxide and then the coated support can be calcined to activate the catalyst.

The platinum group metals (e.g. platinum, palladium, ruthenium, iridium, rhodium or combinations thereof) in the process of the present invention can be provided in any form known to the art, as for instance, a suitable platinum group metal inorganic compound. The addition of this compound to the refractory oxide is preferably accomplished by use of a solution of a water-soluble inorganic salt of the platinum group metal or metals. The amount of platinum group metal compound added will vary, but in all instances will be that sufficient to provide a small but catalytically effective amount of the platinum group metal in the final catalyst for the purpose for which the catalyst is intended. For example, in automobile exhaust oxidation and other similar oxidation processes the amount of impregnating platinum group metal compound selected is that which provides at least about 1.4 grams, often up to about 7 grams, preferably about 1.8 to 4.8 grams, of platinum group metal per liter of unitary body support, usually this amount constitutes about 0.01 to 10 percent, preferably about 0.2 to 1 percent platinum group metal (based on total supported catalyst). The preferred platinum group metals are platinum and palladium. Palladium is especially good for the oxidative purification of exhaust from automobiles employing non-leaded gasolines. The catalyst may contain other metallic or non-metallic catalytic promoters in addition to the platinum group metal.

It is preferred and advantageous that the platinum group metal be fixed or well dispersed in the active refractory metal oxide as, for instance, by hydrogen sulfide treatment to provide the metal in the active refractory oxide as the insoluble sulfide. This fixing of the platinum group metal curtails its migration during drying and calcination. Although the fixing of the metal can be conducted after the aqueous dispersion of the refractory metal oxide and platinum group metal is applied to the refractory support it is preferred that the fixing occur prior to application of the aqueous dispersion. In many instances application of the platinum group metal compound and active refractory oxide to the support without the platinum group metal being fixed to the oxide results in some of the platinum group metal penetrating the pores of the support and being covered by the refractory oxide thereby producing a catalyst less active for various oxidation processes such as automobile exhaust oxidations.

Any method known to the art whereby the platinum group metal can be fixed to the active refractory metal oxide, that is prevented from migrating, can be employed but hydrogen sulfide treatment is preferred. Hydrogen sulfide treatment can be conducted in any suitable manner, as for instance, by maintaining the platinum group metal-active refractory metal oxide combination in an atmosphere of hydrogen sulfide for a time sufficient to provide the platinum group metal on the active metal oxide as the insoluble sulfide. Usually at least about 10 minutes of purging with hydrogen sulfide at ambient temperature is quite sufficient. The hydrogen sulfide treatment is generally conducted prior to applying the platinum group metal-active refractory metal oxide combination to the refractory support, but the treatment may be carried out after such application. It is also possible to prepare a sol from a soluble platinum compound and hydrogen sulfide and apply this to the hydrous or refractory metal oxide.

The water content of the aqueous dispersion of the platinum group metal and refractory metal oxide to be applied to the support should be controlled so that the solids content of the dispersion or suspension is in the range of about 10 or 30 to 70%, preferably 15 or 30 to 50% by weight. This solids content gives a dispersion having a consistency conducive for application and provides on application to the support a suitable amount of platinum group metal-containing refractory metal oxide. A solids content of 15 to 50% by weight is preferred since there are instances where solids content of 50% provides dispersions too viscous for convenient application. In order to prepare a catalyst having 10% activated alumina on a zircon-mullite structure, for example, about 20–40% solids in the suspension may be used.

Reduction of the active refractory metal oxide combined with platinum group metal to a finely divided, dispersible, form can be performed by any means known to the art. A preferred method involves subjecting the calcined oxide or mixture particles to a grinding or milling operation with water so as to obtain a thixotropic slip having the desired consistency, with a solids content as noted above.

Application of the aqueous dispersion of the present invention to the support can be performed in any manner that uniformly applies the dispersion to the support. A convenient and preferred method comprises merely immersing the support into the aqueous dispersion for a time sufficient to insure a thin uniform coating. The support, with its coating, is then removed, dried and calcined to provide the support with a thin adhering film of platinum group metal-containing active refractory metal oxide. If desired, the coated support prior to drying and calcining, can be treated with hydrogen sulfide if such treatment has not already been conducted prior to the application.

In general, calcining temperatures within the range of about 150 to 700 or 800° C. are employed. The calcination is favorably conducted in air for example flowing dried air, or may be carried out in contact with other gases such as oxygen, nitrogen, hydrogen flue gas, etc. or under vacuum conditions. The refractory oxide is deposited on the surfaces of the skeletal structure including the channel surfaces and superficial macropores in communication with the channel surfaces as thin deposits in a weight ratio of about 1% to 50% and preferably about 5% to 30% relative to the weight of the support.

In a preferred method of application, the support is wetted prior to providing the film of platinum group metal-containing active refractory metal oxide. This operation comprises immersing the support into water for a time sufficient to fill the pores of the support with water. The support is then drained and can be blown with air or or other gas to remove excess water. In a preferred embodiment a zircon-mullite skeletal structure is immersed in an aqueous suspension containing the desired weight concentration of hydrated refractory oxide. The skeletal structure because of its porosity, has been found to absorb the suspension readily. The catalyst structure is then dried and calcined at a temperature of about 400° C.–800° C., and preferably 450° C.–550° C. A ⅛ cubic foot zircon-mullite block may absorb roughly 0.25 to 1 liter of the suspension.

The catalytically active refractory metal oxide is deposited on the unitary skeletal support as a continuous thin deposit or as discontinuous thin deposits usually of a thickness of about 0.0001 to 0.005 inch, preferably 0.0004 to 0.001 inch and when mixed with platinum group metal, makes up the film or coating on the support of the present invention. The catalytically active refractory metal oxide is characterized by a porous structure which possesses a large internal pore volume and total surface area. Its presence in the catalyst of the present invention is important since impregnation of the carrier directly with the platinum group metal provides an unsatisfactory catalyst. Generally, the total surface area of the active refractory metal oxide film will be at least about 25 square meters/gram, preferably at least about 100 square meters/gram. These areas can be prepared by at least partially, preferably substantially completely, dehydrating and thus activating the hydrate form of the oxide by calcination usually at temperatures of 150 to 700 or 800° C. or somewhat more.

The preferred active metal oxides contain members of the activated or gamma-alumina family which can be prepared by precipitating a hydrous alumina gel and thereafter drying and calcining to expel hydrated water and provide the active gamma-alumina. A particularly preferred active refractory metal oxide is obtained by drying and calcining at temperatures of about 300 to 700 or 800° C. a mixture of precursor alumina phases predominating in crystalline trihydrate, that is, containing in excess of about 50% of the total alumina hydrate composition, preferably about 65 to 95% of one or more of the trihydrate forms gibbsite, bayrite and nordstrandite (previously known as randomite) as defined by X-ray diffraction. The substantial balance of the hydrate, i.e., at least 5%, preferably 5 to 35%, may be amorphous hydrous or monohydrate (boehmite) alumina. Calcination of the precursor hydrous alumina is preferably controlled so that the gamma-alumina obtained contains monohydrate alumina in an amount substantially equivalent to that originally present in the mixture of the high trihydrate precursor hydrous alumina phases. Other suitable active refractory metal oxides include, for example, active or calcined beryllia, zirconia, magnesia, thoria, silica, etc., and combinations of metal oxides such as boria-alumina, silica-alumina, etc. Preferably the refractory metal oxide is composed predominantly of oxides of one or more metals of Groups II, III and IV having atomic numbers not exceeding 40. The concentration of the active refractory metal oxide is about 15 to 150 grams per liter of the unitary support, preferably about 30 to 75 grams per liter.

It should be understood that in one embodiment of the present invention the refractory metal oxide is in a substantially active form when originally mixed with the platinum group metal compound, and the aqueous dispersion formed is of the finely divided active refractory metal oxide and a platinum group metal inorganic compound, whereas in a second embodiment of the present invention the hydrated inactive, "sol" form of the refractory metal oxide is the starting material which is impregnated with the platinum group metal compound and subsequently calcined to dehydrate and activate the refractory metal oxide and deposite the platinum group metal thereon. The unitary support body is treated with a suspension of such refractory metal oxide and platinum group metal compound as has been discussed. Either before or after such application to the support body the platinum group metal may be fixed to the refractory metal oxide by hydrogen sulfide treatment. As has been noted the refractory metal oxide may be either in hydrous or activated form at the time of such treatment.

The combined support, refractory metal oxide, and platinum group metal compound is dried and calcined. Such calcination may be accomplished during the period of initial use in converting exhaust gases, but this is not a preferred operation since it could give rise to discharge of contaminated gases during this stage of operation. The catalyst containing the platinum group metal may be reduced as by contact with molecular hydrogen at elevated temperatures before, during or after calcination. In the final catalyst the platinum group metal may be in free or combined state but if in elemental form it is preferred that the metal be in sufficiently divided state that it is not detectable by X-ray diffraction techniques, i.e., as crystallites of less than 50 A. size.

Particularly preferred supports for the catalyst of the present invention having especial applicability in the catalytic oxidation of automobile exhaust gases, are unitary refractory or ceramic structures characterized by a plurality of relatively thin-walled cellular channels passing from one surface to the opposite surface and providing a large amount of superficial surface area. The channels can be one or more of a variety of cross-sections selected from a variety of predetermined shapes and sizes, each space being defined by ceramic walls and usually such channels are separated from one another by a wall of refractory or ceramic material. The channels can be in the shape, for example, of triangles, rectangles, squares, sinusoids, circles or other circular shapes, etc. so that cross-sections of the support represent a repeating pattern that can be described as a corrugated, lattice or honeycomb structure. Cross-sections with sharp, acute angled corners are not preferred as they can collect solids such as lead compounds from the gases and become plugged and/or catalytically inactive. For purposes of reference, these ceramic structures will be referred to as corrugated ceramic supports. The walls of the cellular channels are generally of the minimum thickness necessary to provide a strong unitary body. This wall thickness will often fall in the range of about 2 to 25 mils. With this wall thickness the structures contain from about 3 to 18 openings or more per linear inch, preferably about 4 or 5 to 15 openings per linear inch. For automobile exhaust oxidation, however, openings of 20 or more are usually avoided since they have been found too small to prevent plugging thereof by particulate matter in the exhaust. Expressed as openings per square inch, the number of holes ranges between about 30 and 2000, with 60 to 600 preferred. The height and width of the structures will in general each be at least about 1" and will not exceed about 10". Usually maximum height will be about 3". The length of the structure may often vary from about 6" to 34".

A corrugated ceramic support of this type commercially available has the following properties:

Material: Alpha-alumina.
Form:
    Cylindrical.
    20 corrugations/inch.
    Wall thickness—3 mils.
Thermal conductivity (perpendicular to channel axis) cal./cm.$^2$/cm./sec./deg. C. ---- .0005
Compressive strength (parallel to channel axis) p.s.i. ---- 5000
Bulk surface area, ft.$^2$/ft.$^3$ ---- 2000
Bulk density:
    gms./cm.$^3$ ---- .54
    lbs./ft.$^3$ ---- 35
Cross-sectional opening, percent ---- 80

The corrugated ceramic structures can be prepared from any of the chemically inert refractory material previously mentioned although zircon-mullite and alpha-alumina are preferred. Any convenient method known to the art can be employed in the preparation of the structures as, for instance, the method described in British Patent 882,484. Deposition of the active metal oxide film and the impregnation of the film is accomplished as previously described.

Externally the unitary body itself can, of course, be shaped, as previously mentioned, to fit the reaction zone provided in the exhaust or other system into which it is to be eventually disposed as a catalyst and the catalyst is placed lengthwise as to its cellular channels so that the exhaust gases flow through the multiple channels during their passage through the reaction zone. For example, the catalyst can be placed in an automobile muffler. Alternatively, the catalyst can be fitted within the exhaust pipe of the automobile, usually preceeding the muffler. Advantageously, molecular oxygen from an outside source can be provided to assist in the oxidation of exhaust gases. For example, air can be injected preferably in an amount of about 3 to 50% air based on the exhaust gas volume. High percentages of air are usually employed at idle and lower amounts can be used under acceleration and cruising conditions. Also, if desired the air can be preheated as by heat exchange contact with the engine or its exhaust system.

The exhaust line can be provided with one or more of the unitary catalyst structures. Where more than one of the catalyst structures is used, the structures are in a fixed and predetermined relationship to each other and to the gas flow, for example, the structures may be in parallel with respect to gas flow to insure a small pressure differential, or in series for more intensive treatment. In this latter situation, catalyst structures differing in their type of catalytic activity may be employed. In general, the amount of catalyst to be employed may vary with the size of the automotive engine, as measured in cubic inches of engine piston displacement. The amount of catalyst used can be affected by various factors of engine operation such as gasoline consumption, load on the engine, etc., but in general the amount of catalyst may be sufficient to provide about 15 to 200 square inches of superficial surface area per cubic inch of engine piston displacement; however, for passenger automobiles of the sizes most widely used in the United States of America about 20 to 80, preferably about 30 to 50, square inches of catalyst superfiical surface area per cubic inch of engine piston displacement should be provided. The catalyst of this invention offers a distinct advantage over pelleted catalyst systems which, according to U.S. Patent No. 3,024,593, need about 115 to 250 square inches of catalyst surface per cubic inch of engine displacement, generally exceeding 165 in.$^2$/in.$^3$, in American passenger cars.

By contact of the exhaust gases with the catalyst structure nocuous hydrocarbons and carbon monoxide of the exhaust gases are thereby removed or eliminated, and nocuous nitrogen oxides may be removed. Apparently, the hydrocarbons are removed by being catalytically oxidized to innocuous carbon dioxide and water, and the carbon monoxide is removed by being catalytically oxidized to innocuous carbon dioxide. The extent of nitrogen oxides removal depends in part on the fuel-oxygen ration reaching the catalyst. Reaction temperatures are usually maintained at about 150 to 800° C. by use of suitable insulation for the reaction zone and catalyst. The thus-treated exhaust gases, free, or substantially free, of nocuous constituents, are then discharged safely into the atmosphere.

In general the desired space velocity for any continuous catalyst process varies with the nature of the process and it is of important economic advantage to operate at as high a space velocity as produces the desired result. Thus when increase of space velocity is possible with maintenance of satisfactory operation, the required amount of catalyst for the process may be decreased.

The unitary ceramic catalyst of the present invention is superior to the prior art particulate catalysts for high space velocity reactions in that, for all or nearly all particular applications, a higher space velocity may be used. Space velocity for fast gas phase reactions as high as 1,500,000 VHSV (volumes of gas per volume of catalyst per hour) are operable with this catalyst. For the auto exhaust purification and other applications space velocities with unitary ceramic catalysts may range from about 3,000 hr.$^{-1}$, e.g. at idle to about 250,000 hr.$^{-1}$, e.g. at acceleration or cruising. Preferred space velocities for such acceleration or cruising are in the range of 30,000 hr.$^{-1}$ to 120,000 hr.$^{-1}$.

When particulate catalysts are employed for high space velocity reactions, for example, auto exhaust purification, it is necessary to use large particles of very thin catalyst beds of smaller particles to prevent excessive back pressure. Auto engine operation is unfavorably affected if back pressure is high. The problem of holding pellets in place with such as screens increases as smaller pellets are used and fine screens to hold the pellets together with coarser backing screens for strength may become necessary. Such small particles may move and abrade in the beds with high space velocity gas streams.

For reactions where the rate of reaction is very high, the activity of a catalyst of a given composition is approximately proportional to catalyst superficial surface area. To give examples, superficial surface area for a unitary ceramic block with 7 to 8 corrugations per inch is about 1.98 m.$^2$/l, for 1/8″ x 1/8″ cylindrical alumina pellets about 1.11 m.$^2$/l. and for 1/4″ alumina spheres about 0.48 m.$^2$/l. Such ceramic blocks have considerably less back pressure than 1/8″ pellets and no more back pressure than 1/4″ spheres. This means that, under equal back pressure conditions, the unitary ceramic catalyst has at least four times the activity of the 1/4″ spheres for purification of auto exhaust.

Although the catalyst prepared by the method of the present invention finds particular utility in auto exhaust purification, its use is not limited thereto. It also finds use in a variety of catalytic processes where a rugged catalyst of high surface area is desired, particularly gas phase processes occurring favorably at very high space velocity.

The following examples are included to further illustrate the present invention.

*Example I*

Hydrated alumina analyzing 2% amorphous hydrous alumina, 18% boehmite, 44% bayerite, 28% norstrandite and 8% gibbsite, was drum dried and calcined at 340° C. for six hours to yield a composition of 86% gamma alumina and 14% boehmite. Two pounds of such drum dried alumina was added to a pellet mill with 910 mls. of deionized water and 20 ml. of concentrated HCl. The mixture was milled for approximately 18 hours at about 80 to 112 r.p.m. to obtain a thixotropic slip. To 1500 grams of the thixotropic slip were added 63.7 grams of a 40% Pt concentrate of chloroplatinic acid dissolved in 33.0 ml. of deionized water and and additional 26.0 ml. of deionized water to yield a slip having a solids content containing 5% Pt and 95% alumina. The solids were calculated to be 31.4% of the slip.

An alpha-alumina corrugated-type block as defined above and approximately 6″ by 4″ by 3″ passage length and having seven corrugations/linear inch throughout the face of the 6″ length side, weighed 865 grams. The block was made from essentially crystalline alpha-alumina having typically a surface area (total) of 0.6 m.$^2$g., a porosity of 0.20 cc./g. and a macropore distribution such that 5% of the pore volume is in pores of over 20,000 A. and less than 2% of the pore volume is in pores of less than 2,000 A. The block was submerged in deionized water for one hour to fill the pores of the block with water. The block was then drained, blown through, using a high pressure air gun, for about one-half to one minute. The blown block was then weighed to determine the "water-pore volume" and was found to weigh 1,028 grams, giving the block a pore volume of approximately 163 ml. The corrugated block was then immersed in the platinum-containing alumina slip previously prepared for about one minute, while agitating the block and slip so that the slip tended to coat the entire surface of the block and its through corrugations. After shaking and gentle blowing to remove excess slip and ensure free passages, the block was weighed and found to have gained 152 grams in weight.

It was treated with $H_2S$ for about 15 minutes, then dried in a forced-air oven at 110° C. and weighed, while warm, 934 grams. After heating the block for one hour to reach 500° C. and maintaining the block at 500° C. for one hour, it was cooled in a desiccator, and then weighed. It was determined that the block had a total net gain of 60 grams. After further treatment with a stream of air blown through the passages, the block was found to have a total net gain of 66 grams. Based on these findings and the composition of the slip containing 5% Pt, it was determined that about 3 g. of Pt and 63 g. of gamma alumina were deposited on the alpha-alumina block. Finally, the block was washed thoroughly with deionized water and then dried in a forced-air oven.

*Example II*

A 10% alumina slurry was made of 7.90 kg. of hydrous alumina filter cake (containing 2.156 kg. alumina) and 13.3 liters of deionized water. X-ray diffraction analysis of the slurry, dried at 110° C. showed 1% amorphous hydrous alumina, 19% boehmite, 40% bayerite, 33% nordstrandite and 7 gibbsite (80% trihydrates).

A 10% aqueous solution of $H_2PtCl_6$ was then prepared using 284 grams of a 40 Pt concentrate of $H_2PtCl_6$ (equivalent to 113.5 grams Pt) and 850 mls of deionized water. The $H_2PtCl_6$ solution was added slowly to the slurry, using a dropping funnel. The mixture was stirred for 15 minutes and the pH was found to be 2.1. After stirring for an additional 10 minutes, 52.2 liters of $H_2S$ were run into the mixture at a rate of 1,740 ml. per minute. Following the addition of $H_2S$, the mixture was stirred one-half hour and the pH was found to be 1.1. The mixture was then stirred for an additional one and one-half hours and finally drum dried and calcined for six hours at 340° C. The resultant product, on X-ray diffraction analysis, showed 85% gamma alumina, 15% boehmite and no trihydrates.

A thixotropic slip of the calcined platinum-impregnated alumina was prepared using a similar method to that described in Example I, but no HCl was used. Analysis of the slip showed 43.4% solids at 110° C. X-ray diffraction analysis of a sample dried at 110° C. showed 85% gamma alumina, 15% boehmite and no trihydrates.

A water-soaked alpha-alumina block of Example I was immersed in the prepared slip in accordance with the procedure described in Example I. Following the immersion procedure, the block plus slip was dried in a forced-air oven at 110° C., calcined at 500° C. washed thoroughly with deionized water, and finally dried at 110° C., in a forced-air oven. The catalyst block was calculated to have about 2 g. platinum and 45 g. of gamma alumina deposited thereon.

*Example III*

One ounce of Pd black was dissolved in 76 ml. of conc. $HNO_3$. The $Pd(NO_3)_2$ thus formed was added dropwise to a solution containing 41.72 g. of $Na_2Cr_2O_7$ dissolved in 150 ml. $H_2O$, and 153 ml. of conc. $NH_4OH$. The resultant residue was filtered and washed. The filtrate had a pH of 6.8–7.0.

After being dried at 100–110° C., 10 g. of the Pd containing residue was milled with 10 g. of drum dried alumina, 50 ml. $H_2O$ and 2 drops of conc. HCl. The alumina was the same 340° C. calcined alumina as that described in Example I above.

A water-moistened alpha-alumina cylinder approx. 1″ diameter and 2″ length was immersed in the slip milled from the Pd-containing residue and alumina. The cylinder with Pd, Cr and alumina deposited thereon was heated to 360° C. and maintained at 360° C. for 1 hour. About 0.11 g. Pd and 0.16 g. gamma $Al_2O_3$ was deposited on the alpha-alumina cylinder.

The catalysts prepared as in the above examples are suitable for use in exhaust oxidation devices such as those described in application Ser. No. 256,856 (125–141A) to C. D. Keith and T. Schrenuders and Ser. No. 256,930 to C. D. Keith, T. Schreuders and D. L. Bair, both filed Feb. 7, 1963.

It is claimed:

1. A process for preparing a catalyst which comprises forming an aqueous dispersion of calcined catalytically active refractory metal oxide and a platinum group metal compound, said refractory metal oxide having been combined as an aqueous dispersion with a water-soluble platinum group metal compound, applying said formed dispersion to the external surfaces of a chemically inert substantially catalytically inactive refractory support, said support being a solid unitary body having a plurality of unobstructed openings therethrough, and calcining the thus-coated support to provide the support with a film of catalytically active refractory metal oxide containing catalyticaly effective amounts of a platinum group metal.

2. The process of claim 1 wherein the catalytically active refractory metal oxide is of activated alumina.

3. The process of claim 2 wherein the platinum group metal is platinum.

4. The process of claim 1 wherein the aqueous dispersion has a solids content of about 15 to 50%.

5. The process of claim 1 wherein the unobstructed openings of said inert refractory support are defined by chemically inert substantially chemically inactive refractory walls of about 2 to 25 mils in thickness.

6. The process of claim 1 wherein the support is wet with water prior to application of said dispersion.

7. The process of claim 1 wherein the active refractory metal oxide is derived by calcination of alumina hydrate predominating in trihydrate, and said film has a thickness of about 0.0001 to 0.005 inch.

8. The process of claim 1 wherein the inert support is alpha alumina.

9. A process for preparing a catalyst which comprises forming an aqueous dispersion of calcined finely divided catalyticaly active refractory metal oxide and water, providing said dispersion with a platinum group metal compound, applying the resulting mixture to the external surfaces of a chemicaly inert, substantialy catalytically inactive support, said support being a solid unitary body having a plurality of unobstructed opening therethrough, and calcining the thus-coated support to provide the support with a film of said active refractory metal oxide containing catalytically effective amounts of a platinum group metal.

10. The process of claim 8 wherein the active refractory metal oxide is active alumina.

11. The process of claim 8 wherein the platinum group metal is platinum.

12. The process of claim 1 wherein the aqueous dispersion of platinum group metal compound and refractory metal oxide is contacted with hydrogen sulfide prior to said application to fix the platinum group metal on the refractory metal oxide as the sulfide.

13. The process of claim 1 wherein the support has a major proportion of crystalline material, a total surface area of at least about 0.08 square meters per gram of said support, an accessible pore volume of at least about 0.03 cubic centimeters per gram of support, a macropore distribution such that over 95% of the pore volume is in pores having a diameter of over 2,000 A. and over 5% of the pore volume is in pores having a diameter of over 20,000 A., and the film of catalytically active refractory metal oxide containing catalytically effective amounts of a platinum group metal has a total surface area of at least about 25 square meters per gram of said film.

14. The process of claim 1 wherein the platinum group metal compound is added to an alumina hydrogel and the composite calcined to a catalytically active state and mixed with water to form said aqueous dispersion.

15. The process of claim 1 wherein the platinum group metal is said formed dispersion is fixed on said refractory metal oxide.

References Cited
UNITED STATES PATENTS

| | | | |
|---|---|---|---|
| 2,659,701 | 11/1953 | Heard | 252—439 |
| 2,708,187 | 5/1955 | Kearby | 252—466 |
| 2,742,437 | 4/1956 | Houdry | 252—477 X |
| 3,224,831 | 12/1965 | Stephens | 252—437 X |

OSCAR R. VERTIZ, *Primary Examiner.*

A. J. GREIF, *Assistant Examiner.*